United States Patent
Jayasena et al.

(10) Patent No.: US 10,282,308 B2
(45) Date of Patent: May 7, 2019

(54) METHOD AND APPARATUS FOR REDUCING TLB SHOOTDOWN OVERHEADS IN ACCELERATOR-BASED SYSTEMS

(71) Applicant: Advanced Micro Devices, Inc., Sunnyvale, CA (US)

(72) Inventors: Nuwan Jayasena, Sunnyvale, CA (US); Andrew G. Kegel, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 330 days.

(21) Appl. No.: 15/191,462

(22) Filed: Jun. 23, 2016

(65) Prior Publication Data
US 2017/0371805 A1    Dec. 28, 2017

(51) Int. Cl.
*G06F 12/10*     (2016.01)
*G06F 12/1027*   (2016.01)
*G06F 12/1009*   (2016.01)

(52) U.S. Cl.
CPC ...... *G06F 12/1027* (2013.01); *G06F 12/1009* (2013.01); *G06F 2212/1016* (2013.01); *G06F 2212/1024* (2013.01); *G06F 2212/151* (2013.01); *G06F 2212/682* (2013.01)

(58) Field of Classification Search
CPC .................................................. G06F 12/0815
See application file for complete search history.

(56) References Cited

U.S. PATENT DOCUMENTS

| | | | | |
|---|---|---|---|---|
| 2006/0294319 A1* | 12/2006 | Mansell | ............. | G06F 12/0831 711/146 |
| 2007/0277000 A1* | 11/2007 | Ohtsuka | ............. | G06F 12/1027 711/133 |
| 2013/0031333 A1* | 1/2013 | Sankaran | ............. | G06F 12/1027 711/207 |

OTHER PUBLICATIONS

Romanescu, B.F. et al., "UNified Instruction/Translation/Data (UNITD) Coherence: One Protocol to Rule Them All", 16th International Symposium on High-Performance Computer Architecture (HPCA), Jan. 2010, pp. 1-12, Bangalore, India.

Villavieja, C. et al., "DiDi: Mitigating the Performance Impact of TLB Shootdowns Using a Shared TLB Directory", 2011 International Conference on Parallel Architectures and Compilation Techniques (PACT), Oct. 10-14, 2011, pp. 340-349, IEEE, Galveston, TX, USA.

Oskin, M. et al., "A Software-managed Approach to Die-Stacked DRAM", Proceedings of the 2015 International Conference on Parallel Architecture and Compilation (PACT), Oct. 18, 2015, pp. 188-200, IEEE Computer Society, Washington, DC, USA.

* cited by examiner

*Primary Examiner* — Ann J Lo
*Assistant Examiner* — Eric T Loonan
(74) *Attorney, Agent, or Firm* — Volpe and Koenig, P.C.

(57) ABSTRACT

A method and apparatus for reducing TLB shootdown operation overheads in accelerator-based computing systems is described. The disclosed method and apparatus may also be used in the areas of near-memory and in-memory computing, where near-memory or in-memory compute units may need to share a host CPU's virtual address space. Metadata is associated with page table entries (PTEs) and mechanisms use the metadata to limit the number of processing elements that participate in a TLB shootdown operation.

15 Claims, 5 Drawing Sheets

METHOD AND APPARATUS FOR
REDUCING TLB SHOOTDOWN
OVERHEADS IN ACCELERATOR-BASED
SYSTEMS

BACKGROUND

Translation lookaside buffers (TLBs) are hardware structures that are used in computing systems to cache virtual-to-physical address translations and operating system (OS)-page-granularity metadata (e.g., read/write permissions). The TLB is important to performance scalability in computing systems because the TLB is looked up on every memory access. Because the TLB is accessed on every single memory access, it is in the critical path and each processor core or accelerator has its own TLB. TLBs are kept coherent at the software-level using an operating system (OS). Whenever the OS modifies page translations or permissions in a page table, it initiates a coherency transaction among TLBs. This process is known as a TLB shootdown.

A TLB shootdown is an important but a time consuming and resource-intensive operation that requires putting all processing elements (e.g., a central processing unit (CPU) having one or more processor cores and one or more accelerators) operating or having operated in the same virtual address space into a quiescent state and ensuring modified page translations are purged from their virtual address translation caches. The overheads associated with TLB shootdown operations are expected to get worse as heterogeneous system architecture (HSA), input/output memory management unit (IOMMU), and other similar technologies enable accelerators to operate in the same virtual address spaces as processor cores and the number of accelerators in computing systems increase. There exists the need to reduce the overhead associated with TLB shootdowns.

BRIEF DESCRIPTION OF THE DRAWINGS

A more detailed understanding can be had from the following description, given by way of example in conjunction with the accompanying drawings wherein.

DETAILED DESCRIPTION

The detailed description provides a method and apparatus for reducing TLB shootdown operation overheads in accelerator-based computing systems. The method and apparatus describe the use of metadata associated with page table entries (PTEs) and mechanisms that use the metadata to limit the number of processing elements that participate in a TLB shootdown operation.

A reference count is initialized to zero for each PTE. The reference count indicates a number of TLBs caching a translation from the PTE. When a translation is added to a TLB, the reference count is incremented. When a translation is evicted from a TLB, the reference count is decremented. When it is determined that a TLB shootdown is needed for one or more PTEs, the reference count for the PTEs is checked.

The TLB shootdown is not performed when the reference count for the one or more PTEs is zero. The translation for the PTEs is updated. The TLB shootdown is performed only when the reference count for the one or more PTEs is not zero.

Alternatively, a device ID list is initialized and maintained for each PTE. The device ID list includes up to N device IDs where each device ID corresponds to a processing element. In response to copies of a translation of a PTE being inserted or evicted from one or more TLBs, device IDs are added or removed from the device ID list of the PTE. If the device ID list for a PTE exceeds its capacity, the PTE is marked in the device ID overflow (IDOF) state. The IDOF marking is a special state marking that indicates an overflow of the device ID list of a PTE. When it is determined that a TLB shootdown is needed for one or more PTEs, the PTEs are checked to see if the PTEs are marked in the IDOF state.

Only the processing elements in the device ID lists of the one or more PTEs participate in the TLB shootdown when none of the one or more PTEs is marked in the IDOF state. The TLB shootdown is performed in all processing elements that operate or have operated in the same address space when at least one of the PTEs is marked in the IDOF state.

Additionally, a reference count and a device ID list are initialized and maintained for each PTE. As described above, a reference count is initialized to zero and a device ID list is initialized and maintained for each PTE. When a translation is added to a TLB, the reference count is incremented. When a translation is evicted from a TLB, the reference count is decremented. If a PTE is not marked in the IDOF state, device IDs are added or removed from the device ID list in response to copies of a translation being inserted or evicted from one or more TLBs. If the device ID list for a PTE becomes full, the PTE is marked in the IDOF state. When it is determined that a TLB shootdown is needed for one or more PTEs, the PTEs are checked to see if the reference count for a PTE is zero and if the PTEs are marked in the IDOF state.

The TLB shootdown is not performed when the reference count for the one or more PTEs is zero. The translation for the PTEs can be updated. Only the processing elements in the device ID lists of the one or more PTEs participate in the TLB shootdown when the reference count for the one or more PTEs is not zero and none of the one or more PTEs is marked in the IDOF state. The TLB shootdown is performed in all processing elements in the device ID list of the one or more PTEs when the reference count for a PTE is not zero and at least one of the PTEs is marked in the IDOF state.

Further, the disclosed method and apparatus are used in the areas of near-memory and in-memory computing, where near-memory or in-memory compute units need to share a host CPU's virtual address space.

All processing elements that operate or have operated in the same address space must be involved in a TLB shootdown regardless of whether it has ever performed a translation on the particular page table entries (PTEs) whose translations are being modified. This results in unnecessarily high performance overheads, especially as the number of processing elements that operate within an address space increases. Traditionally, this was limited to the number of processor cores in a system. But with techniques such as HSA and IOMMU, this includes accelerators, which can reside outside a processor, thereby increasing the potential overhead of TLB shootdowns. Examples of accelerators include, but are not limited to, graphics processing units (GPUs), in-memory processors, field programmable gate arrays (FPGAs), and other similar processing units.

Modern OSs attempt to reduce participation in TLB shootdowns by only issuing invalidations to processor cores or accelerators that could have had access to the translations. However, this can only be done conservatively at a coarse grain level due to limited visibility from system software. This disclosure provides a more accurate tracking of which processor cores or accelerators actually have accessed specific translations in order to further reduce the number of processor cores or accelerators that must participate in TLB shootdowns.

A unified hardware coherence scheme encompassing caches and TLBs eliminate the need for OS driven TLB shootdown operations. However, it also requires re-architecting and combining of two complex systems, cache coherence and address translation mechanisms, which is often difficult to do in commercial settings. A re-architecting of these systems is not required in this disclosure.

It has been proposed that a hardware structure maintain a bit vector indicating which processing elements have a translation for every virtual page that is mapped in any TLB in a computing system. However, this approach is only viable in systems where the number of TLBs in the system is known at design time. This approach is not feasible in systems where the number and configuration of off-chip accelerators that operate in the same virtual address space are not known at design time and vary from system to system.

Some processor architectures incorporate hardware support for generating TLB invalidation messages. However, these TLB invalidation messages are sent to all processors, processor cores, or accelerators. This disclosure allows for selective filtering so that TLB invalidation messages are only sent to processor cores or accelerators that have a cached copy of the translation being invalidated.

Commonly used schemes for TLB shootdowns require that any processor core or accelerator that has a copy of a translation needs to be included. This is a drawback for the reasons described above. More particularly, existing mechanisms for reducing the overhead of TLB shootdown handling do not address the aspect of limiting the number of processor cores or accelerators that are involved in TLB shootdowns.

As shown above, the current mechanisms for TLB shootdowns either require drastic re-engineering of memory systems or have limited scalability for future systems with potentially large numbers of accelerators. This disclosure describes a set of mechanisms to maintain metadata associated with PTEs thatis used to limit the number of processing elements that participate in a TLB shootdown operation.

Figure 1:
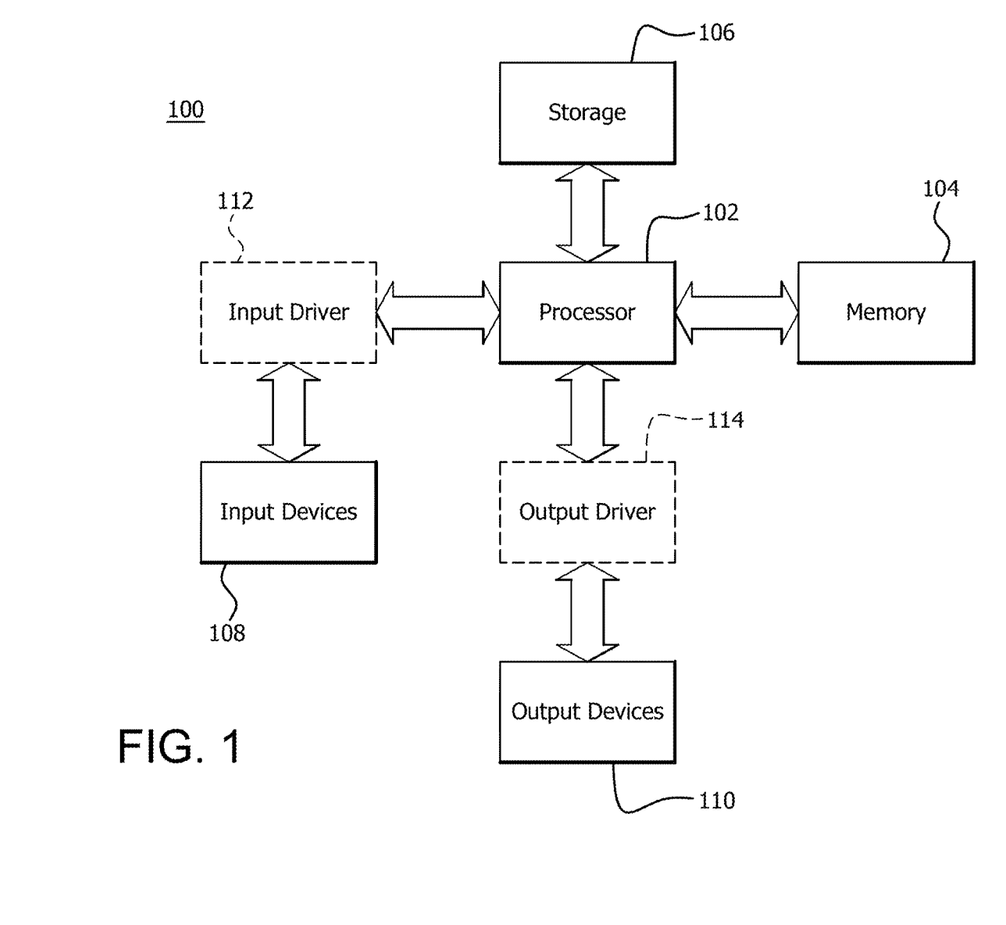
FIG. 1 is a block diagram of an example device in which one or more disclosed embodiments are implemented.

FIG. 1 is a block diagram of an example device 100 in which one or more disclosed embodiments are implemented. The device 100 can be, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 optionally includes an input driver 112 and an output driver 114. It is understood that the device 100 includes additional components not shown in FIG. 1.

The processor 102 includes a CPU having one or more processor cores. The processor 102 can also include one or more accelerators. Examples of accelerators can be, but are not limited to, GPUs, in-memory processors, and FPGAs. The CPU and the one or more accelerators are located on the same die. Alternatively, the CPU and the one or more accelerators are located on different dies. Each of the processing elements in the processor 102 have one or more processor cores. The processing elements in the processor 102 operate in the same virtual address space. In an example, the processor 102 includes a cache for each processor core. The caches in the processor 102 are designed to operate in parallel with a TLB.

The memory 104 is located on the same die as the processor 102. Alternatively, the memory 104 is located separately from the processor 102. The memory 104 includes a volatile or non-volatile memory. Examples of memory 104 include random access memory (RAM), dynamic RAM, or a cache memory.

The storage 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
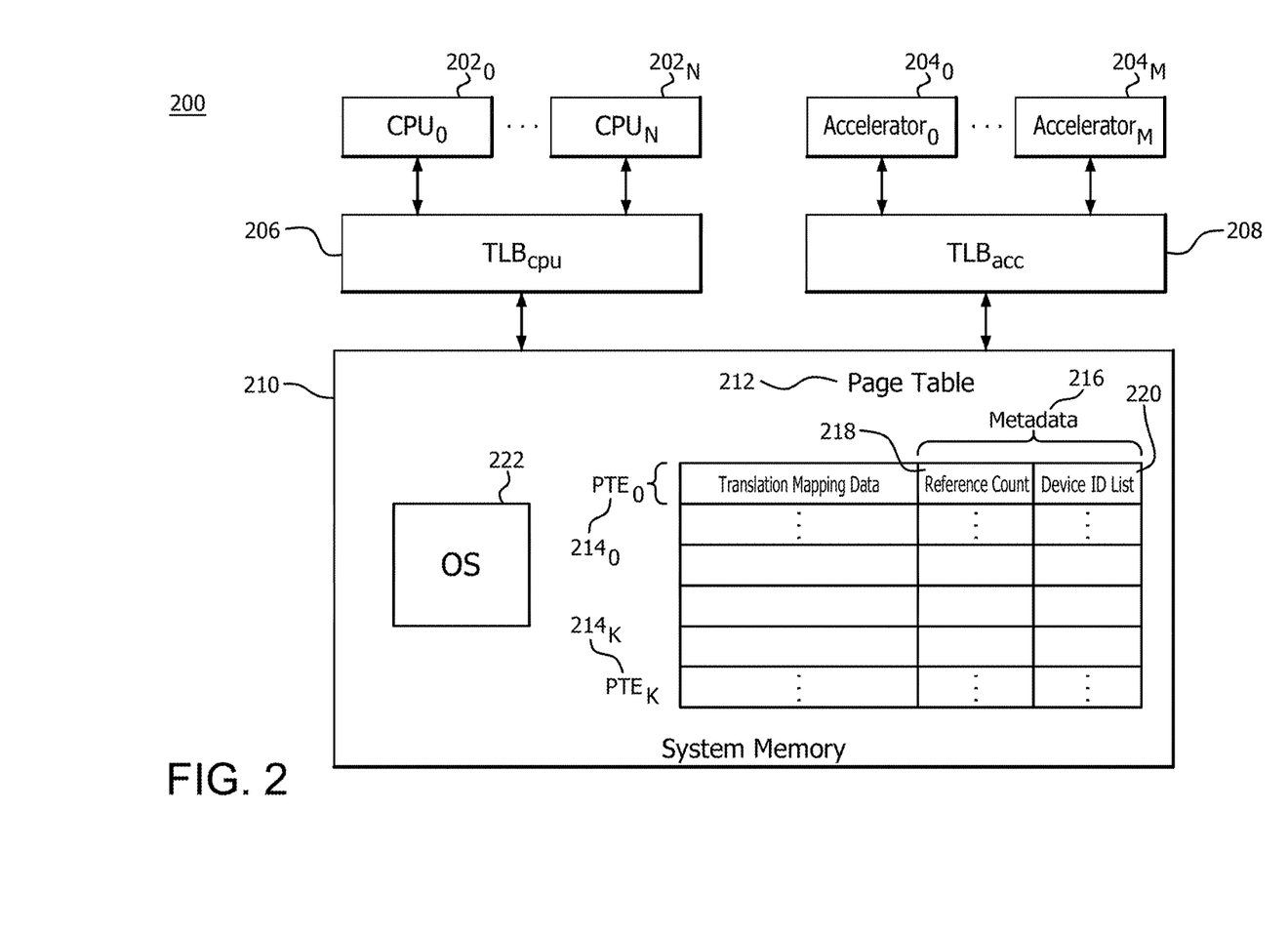
FIG. 2 is a simplified exemplary block diagram of a heterogeneous computing system.

Referring now to FIG. 2, a simplified exemplary block diagram is shown illustrating a heterogeneous computing system 200 having processing elements, including CPUs $202_0$-$202_N$ (generally 202) and accelerators $204_0$-$204_M$ (generally 204), that share a common system memory (address space) 210. The system memory 210 is any type of suitable memory including dynamic random access memory (DRAM) such as SDRAM, the various types of static RAM (SRAM), and the various types of non-volatile memory (e.g., PROM, EPROM, flash, PCM or STT-MRAM).

While the CPUs 202 and accelerators 204 both utilize the same common memory (address space) 210, each of these different types of processing elements has independent address translation mechanisms that are optimized to the particular type of processing element (i.e., the CPUs or the accelerators). Here, the CPUs 202 and the accelerators 204 utilize a virtual addressing scheme to address the common memory 210. Accordingly, a TLB is used to translate virtual addresses into physical addresses so that a processing unit can locate instructions to execute and/or data to process.

As illustrated in FIG. 2, the CPUs 202 utilize $TLB_{cpu}$ 206, while the accelerators 204 utilize an independent $TLB_{acc}$ 208. Each CPU core or accelerator has a separate TLB.

Alternatively, multiple CPU cores or accelerators share one or more TLBs. As used herein, a TLB is a cache of recently used or predicted as soon-to-be-used translations from a page table 212 of the common memory 210, which is used to improve virtual memory address translation speed. The page table 212 is where an OS 222 stores its translations (or translation mappings) of virtual memory addresses to physical memory address. Virtual memory addresses are unique to the accessing process, while physical memory addresses are unique throughout the system consisting of the CPU 202 and accelerator 204.

The page table 212 is used to translate the virtual memory addresses seen by the executing process into physical memory addresses used by the CPU 202 and accelerator 204 to process instructions and load/store data. The page table 212 contains the translations in page table entries (PTEs) $214_{0-K}$. Each PTE 214 in the page table 212 contains translation mapping data and metadata 216. The translation mapping data includes a virtual-to-physical address translation. The metadata 216 includes a reference count 218 or a device ID list 220. Alternatively, the metadata 216 includes both a reference count 218 and a device ID list 220.

Thus, when the CPU 202 or accelerator 204 attempts to access the common memory 210 (e.g., attempts to fetch data or an instruction located at a particular virtual memory address or attempts to store data to a particular virtual memory address), the virtual memory address is translated to a corresponding physical memory address. Accordingly, a TLB is searched first when translating a virtual memory address into a physical memory address in an attempt to provide a rapid translation.

A TLB has a fixed number of slots that contain address translation data (entries), which map virtual memory addresses to physical memory addresses. TLBs are content-addressable memory, in which the search key is the virtual memory address and the search result is a physical memory address. The TLBs is a single memory cache or the TLBs are organized in a hierarchy as is known in the art. However the TLBs are realized, if the requested address is present in the TLB (i.e., "a TLB hit"), the search yields a match quickly and the physical memory address is returned. If the requested address is not in the TLB (i.e., "a TLB miss"), the translation proceeds by looking through the page table 212 in a process commonly referred to as a "page walk" or "page table walk". After the physical memory address is determined, the virtual memory address to physical memory address mapping is loaded in the respective TLB 206 or 208 (that is, depending upon which processor type (CPU or accelerator) requested the address mapping).

In general purpose computing using GPUs (GPGPU computing), a GPU is typically utilized to perform some work or task traditionally executed by a CPU (or vice-versa). To do this, the CPU 202 will hand-off or offload a task to an accelerator (e.g., a GPU) 204, which in turn will execute the task and provide the CPU 202 with a result, data or other information either directly or by storing the information in the common memory 210 where the CPU 202 can retrieve it when needed. In the event of a task hand-off, it is likely that the translation mapping data needed to perform the offloaded task will be missing from the TLB of the other processor type resulting in a cold (initial) TLB miss. As noted above, to recover from a TLB miss, the task receiving processor is required to look through the page table 212 of memory 210 (i.e., a "page walk") to acquire the translation mapping data before the task processing can begin.

$TLB_{cpu}$ 206 and $TLB_{acc}$ 208 operate in the same virtual address space and cache subsets of the same page table 212.

Therefore, when a PTE 214 is modified (e.g., a page is unmapped, a page is marked as read-only from being marked read-write), all processing elements whose TLB contains translations from that PTE 214 are notified to purge the affected entries from their TLB. This requires all processing elements with cached TLB entries from that address space to be put in a quiescent state, the TLBs checked for the relevant entries (or, in some cases, the entire TLB flushed), and the initiating processing element to be notified of completion from each of the processing elements. The initiating processing element then waits for all completions to be received before resuming itself.

When an OS page is unmapped and swapped out to backing storage (e.g., a disk), OS 222 paging policies typically ensure that the page is unlikely to have been accessed recently (except in cases of extreme memory capacity pressure) and its translation is, therefore, unlikely to be in any TLB. There are significant amounts of thread-private data in most applications and translations for PTEs holding such data are likely to be in the TLB of a single processor or device. A number of PTEs 214 that are shared across many processing elements are read-only (e.g., code segments). Therefore, TLB shootdowns associated with the PTEs 214 are often due to page unmappings and not due to copy-on-write or other demotions from writable state. When a PTE 214 is demoted from writable to read-only on copy-on-write operations, there is likely only a single processing element caching that translation mapping data. As a result, a significant number of shootdowns occur for page mappings cached in one TLB or none at all.

In an embodiment, the selection of pages to be unmapped (by operating system software) is biased to minimize TLB shootdown overheads. In other words, PTEs 214 with a reference count 218 of zero or PTEs 214 having only small numbers of valid copies as identified by a device ID list 220 are chosen for unmapping with higher probability. This is achieved by the OS 222 consulting the metadata 216 associated with the PTEs 214 when making unmapping decisions.

As recited above, each PTE 214 in the page table 212 is associated with metadata 216 that is relevant for determining the processor cores and/or devices that participate in a TLB shootdown operation. More particularly, the metadata 216 is used to reduce the number of processing elements that participate in a TLB shootdown operation and allows for improved efficiency of TLB shootdown operations where only a few (or no) processor cores and/or devices are likely to be caching the translation mapping data at a given time.

Alternatively, the metadata 216 is stored in hardware caching structures. The storing of the metadata 216 in hardware caching structures reduces the number of memory accesses needed to update mapping status on TLB insertions and evictions. In an embodiment, hardware caching structures only hold the metadata 216 (and not the translations themselves), thereby allowing the structures to hold a larger number of translations than the TLBs. Further, as these updates are not in the critical path of program execution, the hardware caching structures do not have the same stringent access time requirements as TLBs and can be larger in capacity.

In systems where the PTEs have limited or no spare bits to implement the metadata 216, parallel data structures (that mimic the page table in structure but are not part of the page table itself) are used to store additional state information. Here, page table walkers (hardware or software) need to be updated to process the parallel data structures and the page table, as necessary.

The metadata 216 in the page table 212 is associated with each PTE 214. The metadata 216 includes a reference count 218 that indicates the number of TLBs caching a translation from the PTE. The metadata 216 also includes a device ID list 220 that identifies specific processor cores and/or processing elements caching a translation from the PTE. Each PTE 214 maintains up to N device IDs in the device ID list 220. Even a small value of N (e.g., 1 or 2) is sufficient to capture the cases where only one or two cached copies of a translation exist in the computing system 200. The device IDs stored in the device ID list 220 identify specific processor cores and/or devices caching the translation in the computing system 200. In an embodiment, the storage space for each element of the device ID list 220 is large enough to identify the cores of a main processor and other devices (or processing elements) in the computing system that operate in the same address space. Unlike bit-vector approaches (where storage space grows linearly with the number of devices), the storage space for a device ID list with a fixed number of entries grows slowly (with $\log_2$ of the number of devices). Therefore, a much larger device ID space is able to be provisioned when a computing system is designed.

Figure 3:
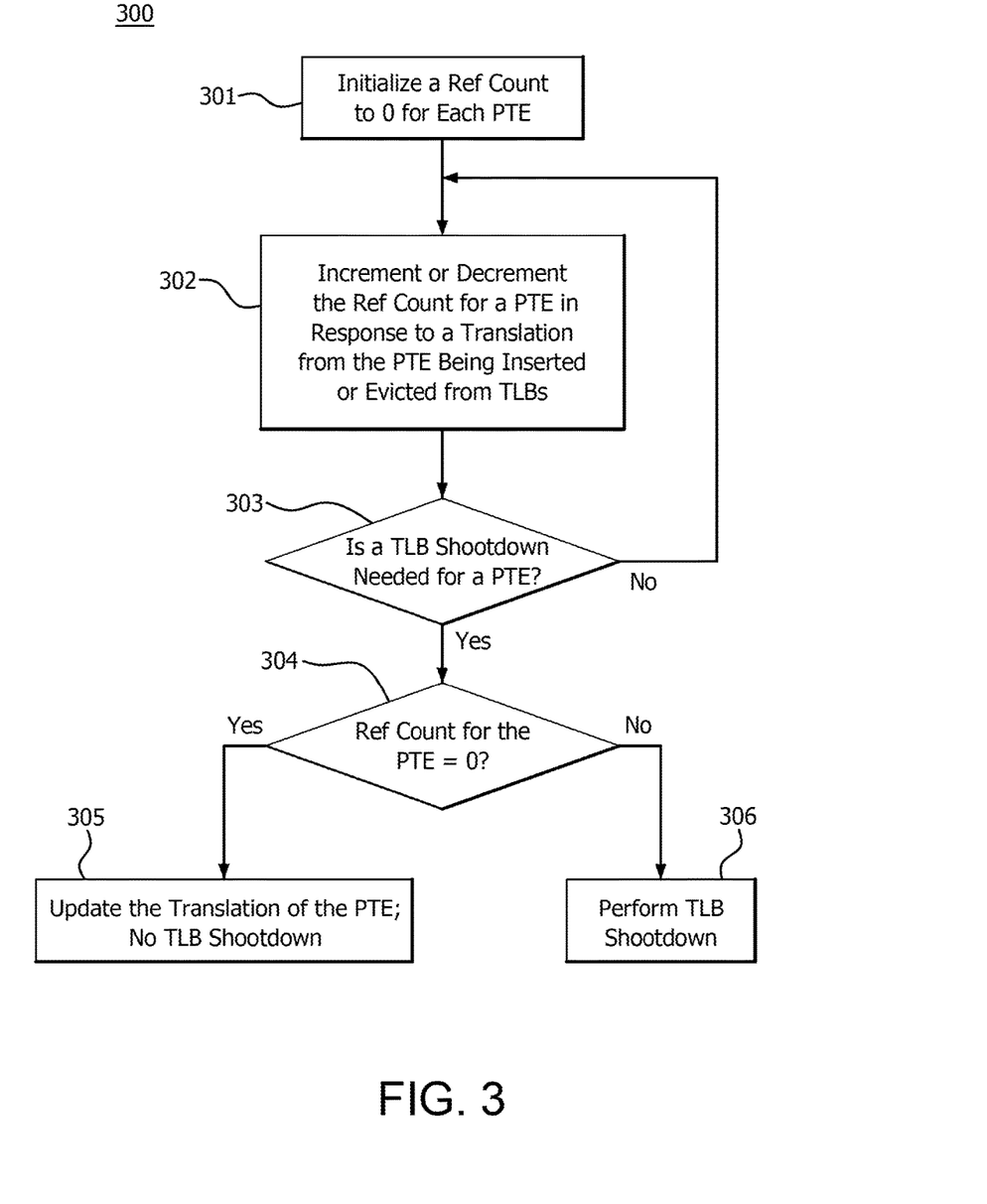
FIG. 3 shows a flow diagram describing the operation of a computing system shown in FIG. 1 and FIG. 2 that uses reference count in order to reduce TLB shootdown overhead.

FIG. 3 shows a flow diagram describing the operation of a computing system shown in FIG. 1 and FIG. 2 that uses reference count in order to reduce TLB shootdown overhead.

In the implementation described in FIG. 3, the computing system maintains a reference count for each PTE. As described above, a reference count indicates the number of TLBs caching a virtual-to-physical address translation from each PTE.

Beginning in block 301 of FIG. 3, the computing system initializes a reference count to zero for each PTE.

Whenever a copy of a translation is added to a TLB, the hardware (e.g., x86) or software (e.g., SPARC) page table walker increments the reference count for a PTE associated with that translation. Whenever a translation from the PTE is evicted or invalidated from a TLB, the reference count for the PTE is decremented (block 302).

The reference count for each PTE is modified as described in block 302 until a TLB shootdown is needed (block 303).

When a TLB shootdown is needed after modifying a set of PTEs, the reference count for each PTE in the set is checked (block 304).

If the reference count for each PTE in the set of PTEs is zero, no TLB shootdown is needed (block 305). This is because the reference count indicates that no TLB is caching the PTE and the translation is updated.

If the reference count for any of the PTEs in the set of PTEs is non-zero, a TLB shootdown is performed (block 306). If a TLB shootdown is performed after modifying multiple PTEs, the TLB shootdown is avoided only when the reference count associated with every one of the modified PTEs is zero. If any of the modified PTEs has a non-zero reference count, a TLB shootdown is performed.

Figure 4:
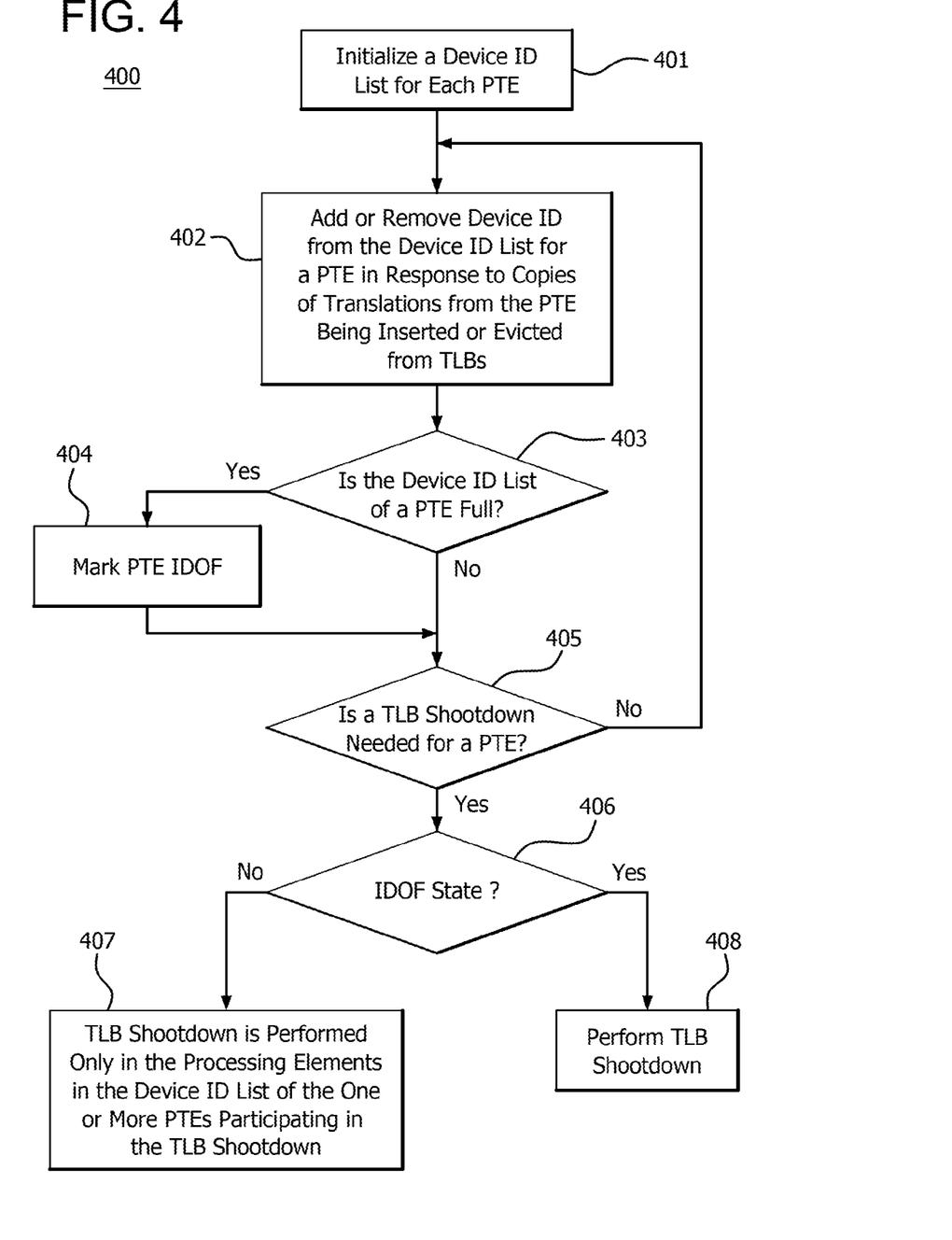
FIG. 4 shows a flow diagram describing the operation of the computing system shown in FIG. 1 and FIG. 2 that uses device IDs in order to reduce TLB shootdown overhead.

FIG. 4 shows a flow diagram describing the operation of the computing system shown in FIG. 1 and FIG. 2 that uses device IDs in order to reduce TLB shootdown overhead.

In the implementation described in FIG. 4, the computing system maintains a device ID list including up to N device IDs. A device ID list is maintained for each PTE.

Beginning in block 401 of FIG. 4, the computing system initializes a device ID list for each PTE. Each of the device IDs in the device ID list identifies specific devices in the computing system caching a translation from the PTE. Each device ID field in the list is large enough to identify each of the cores on a main processor and accelerators in the computing system that operate in the same address space.

Whenever a new processing element (e.g., processor cores or accelerators) caches a translation from the PTE, the device ID of the processing element is added to an unused entry of a device ID list for the PTE corresponding to the mapping. Whenever a translation from the PTE is evicted or invalidated, the device ID corresponding to the processing element is removed from the device ID list for the PTE (block 402).

A determination is made whether the device ID list of a PTE is full (block 403). For example, the device ID of a PTE is full if the number of processing elements caching a translation exceeds N.

The PTE is marked "IDOF" when the device ID list of a PTE exceeds its capacity (block 404). The IDOF marking is a special state marking that indicates an overflow of the device ID list of a PTE. When a PTE marked in the IDOF state needs to be evicted, a normal TLB shootdown is performed. Once a PTE is marked in the IDOF state, no further tracking of cached translations is performed for that PTE until all cached copies of the PTE in the computing system are evicted via a normal TLB shootdown operation.

The device ID list for each PTE is modified as described in blocks 402-404 until a TLB shootdown is needed (block 405). A TLB shootdown is not be needed after modifying a set of PTEs when no valid device IDs are in the device ID lists of the PTEs in the set and none of the PTEs in the set are marked in the IDOF state.

When a TLB shootdown is needed after modifying a set of PTEs, a determination is made whether any of the PTEs are marked in the IDOF state (block 406). Only the processing elements identified in the device ID lists of the PTEs in the set of PTEs participate in the TLB shootdown when none of the PTEs in the set of modified PTEs are marked in the IDOF state (block 407). A normal TLB shootdown is performed in all processing elements that operate or have operated in the same address space if any PTE in the set of PTE is marked in the IDOF state (block 408).

A single device ID is used to represent a collection of processing elements or devices for the purposes of TLB shootdown optimization in the device ID list in some implementations. For example, all processing elements or devices connected to a single interface of the processor (e.g., all in-memory processors attached to a given memory interface of a host) are represented by a single device ID. In another example, all devices of a specific type (e.g., all network interface accelerators) are represented by a single device ID. In alternate example, a software-managed mapping is used to assign collections of processing elements or devices (e.g., all devices working on a specific data structure within an applications) to a single device ID.

Different devices in the computing system can have different costs associated with performing TLB shootdowns. For example, it is more efficient for an on-chip processor core to participate in a TLB shootdown than it is for an off-chip accelerator to participate in a TLB shootdown via an IOMMU. In such cases, the tracking of device IDs as described above is augmented to track information that distinguishes between different device types. This additional information is inferred from device ID ranges or device characteristics. As a result, page selection for unmapping is further biased to select pages with efficient invalidations with higher probability than those with higher overhead invalidations.

Figure 5:
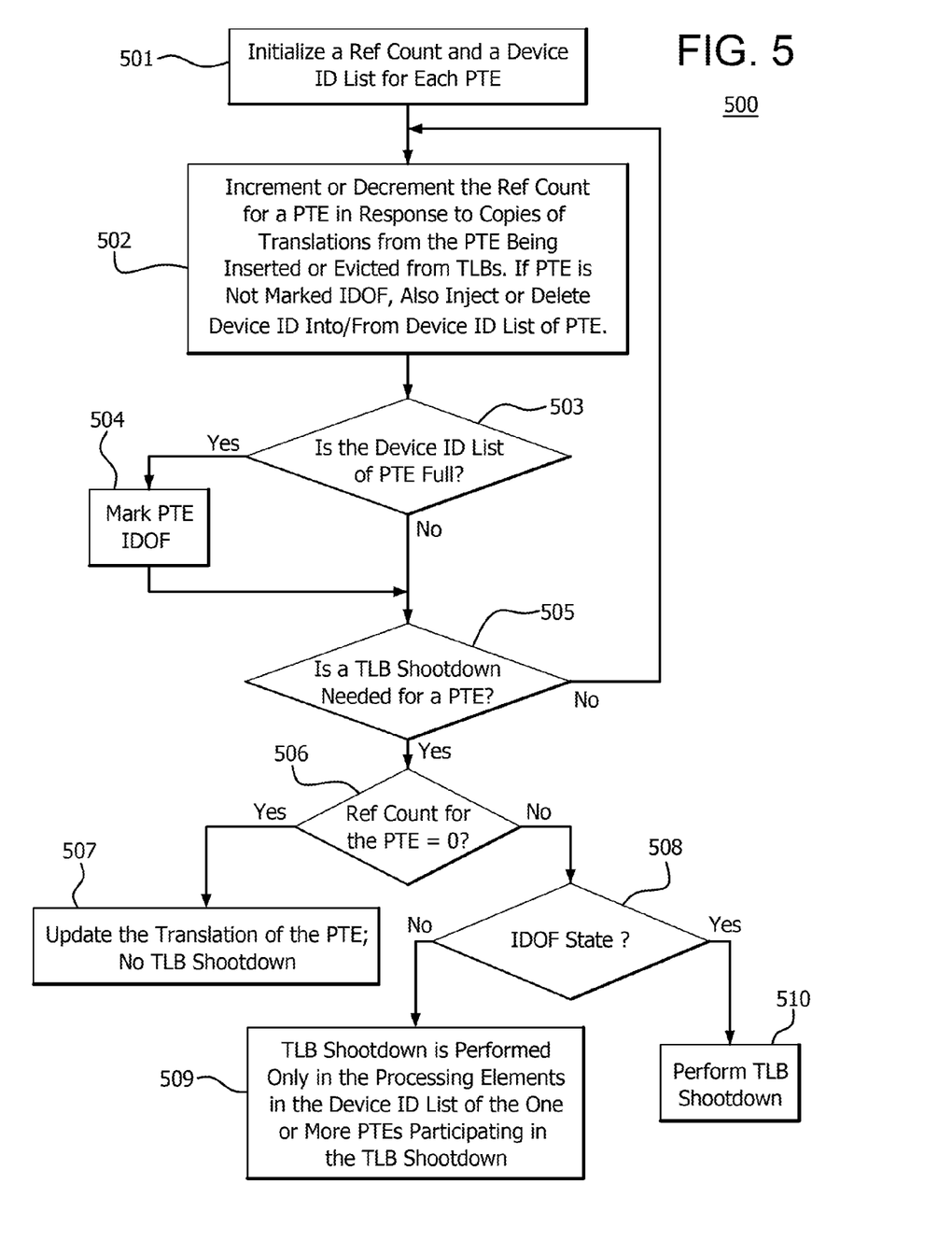
FIG. 5 shows a flow diagram describing the operation of the computing system shown in FIG. 1 and FIG. 2 that uses a reference count and device IDs in a hybrid implementation in order to reduce TLB shootdown overhead.

FIG. 5 shows a flow diagram describing the operation of the computing system shown in FIG. 1 and FIG. 2 that uses a reference count and device IDs in a hybrid implementation in order to reduce TLB shootdown overhead.

In the hybrid implementation described in FIG. 5, the computing system maintains a reference count and a device ID list including up to N device IDs. A device ID list is maintained for each PTE.

Beginning in block 501 of FIG. 5, the computing system initializes a reference count and a device ID list for each PTE. As stated above, each of the device IDs in the device ID list identifies specific devices (or processing elements) in the computing system caching the translation.

The reference count for a PTE is incremented and decremented in response to copies of the translation from the PTE being inserted or evicted from the TLBs and device IDs are inserted or deleted from the device ID list for a PTE provided the PTE is not marked IDOF (block 502). As long as the reference count for a translation has not exceeded N, whenever a new processing element caches a translation, the device ID of the processing element is added to an unused entry of the device ID list associated with the translation and the reference count is incremented by 1. If the reference count has not exceeded N, whenever a TLB entry is evicted or invalidated, the device ID corresponding to the processing element is removed from the list associated with the page mapping and the reference count is decremented by 1.

A determination is made whether the device ID list of a PTE is full (block 503). If, at any point, the device ID list of a PTE exceeds its capacity, the PTE is marked in the IDOF state and remains in that state until the reference count for the PTE reaches zero (block 504). If the reference count reaches zero for a PTE marked in the IDOF state, the IDOF state is cleared and the PTE is marked normal again.

The reference count and device ID list for each PTE are modified as described in blocks 502-504 until a TLB shootdown is needed (block 505).

When a TLB shootdown is needed after modifying a set of PTEs, a determination is made whether the reference count for each PTE in the set of PTEs is zero (block 506).

If the reference count for each PTE in the set of PTEs is zero, no TLB shootdown is needed (block 507). This is because the reference count indicates that no TLB is caching the PTE and the translation can be updated.

If the reference count for each PTE in the set of PTEs is not zero, it needs to be determined whether any of the PTEs are marked in the IDOF state (block 508). Only the processing elements identified in the device ID lists of the PTEs in the set of PTEs participate in the TLB shootdown when none of the PTEs in the set of PTEs are marked in the IDOF state (block 509). A normal TLB shootdown is performed in all processing elements that operate or have operated in the same address space if any PTE in the set of PTEs is marked in the IDOF state (block 510).

The above does not address the handling of data in the caches of a core at the time the address mapping for the data is invalidated in the core's TLB. In many cases, flushing the caches is not necessary if the caches are coherent and fully participate in coherence probes. In such cases, the above mechanisms work as described with no additional requirements.

In cases where cache flushing is necessary (e.g., non-coherent caches), the above mechanisms can be augmented using any one or a combination of the following implementations.

In one implementation, cores whose caches need flushing do not report their TLB evictions. Therefore, the cores continue to be tracked as having translations and the cores are notified when a shootdown occurs. The caches are flushed as necessary upon receiving such notifications.

In another implementation, cores whose caches need invalidations flush their caches of any contents from pages whose mappings are being evicted from the TLB before reporting the TLB entry evictions and no longer need to be notified of subsequent TLB shootdowns.

Some implementations that do need to flush the cache dynamically select between the two implementations described above. The selection criteria is based on OS or architectural policies. Some implementations also incorporate hardware features for profiling and quantifying the overhead of these cache flushes (e.g., time taken, amount of memory traffic generated, etc.) to inform the above-mentioned selection policies.

It should be understood that many variations are possible based on the disclosure herein. Although features and elements are described above in particular combinations, each feature or element can be used alone without the other features and elements or in various combinations with or without other features and elements.

The methods provided are implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors are manufactured by configuring a manufacturing process using the results of processed hardware description language (HDL) instructions and other intermediary data including netlists (such instructions capable of being stored on a computer readable media). The results of such processing are maskworks that are then used in a semiconductor manufacturing process to manufacture a processor which implements aspects of the disclosure.

The methods or flow charts provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use in a computing system to reduce translation lookaside buffer (TLB) shootdown overheads, the method comprising:

initializing a device identifier (ID) list for each page table entry (PTE) in a page table in a memory in the computing system, wherein each PTE includes a translation of virtual memory addresses to physical memory addresses and the device ID list, wherein the device ID list includes up to N device IDs and each device ID is associated with a processing element in the computing system;

adding and removing device IDs from the device ID list for a PTE in response to copies of the translation from the PTE being inserted or evicted from one or more TLBs in the computing system;

marking a PTE in a device ID overflow (IDOF) state in response to the device ID list of the PTE exceeding a capacity of the device ID list, wherein the IDOF marking is a special state marking that indicates an overflow of the device ID list of a PTE;

determining the IDOF state for a PTE;

determining one or more of the one or more processing elements to participate in a TLB shootdown of the PTE in response to determining the IDOF state; and performing the TLB shootdown for the determined one or more processing elements.

2. The method of claim 1, wherein only the processing elements in the device ID lists of the one or more PTEs participate in the TLB shootdown when none of the one or more PTEs is marked in the IDOF state.

3. The method of claim 1, wherein the TLB shootdown is performed in all processing elements that operate or have operated in the same address space when at least one of the one or more PTEs is marked in the IDOF state.

4. A computing system, comprising:
one or more processing elements;
one or more translation lookaside buffers (TLBs) associated with the one or more processing elements;
an operating system (OS); and
a memory comprising a page table that is used by the OS to store translations of virtual memory addresses to physical memory addresses, wherein each page table entry (PTE) is associated with a device ID list, wherein the device ID list includes up to N device IDs and each device ID is associated with the one or more processing elements in the computing system;
the computing system is configured to:
add and remove device IDs from the device ID list for a PTE in response to copies of a translation of the PTE being inserted or evicted from one or more TLBs in the computing system;
mark a PTE in a device ID overflow (IDOF) state in response to the device ID list of the PTE exceeding a capacity of the device ID list, wherein the IDOF marking is a special state marking that indicates an overflow of the device ID list of a PTE; and
determine the IDOF state for a PTE;
determine one or more of the one or more processing elements to participate in a TLB shootdown of the PTE in response to determining the IDOF state; and
perform the TLB shootdown for the determined one or more processing elements.

5. The computing system of claim 4, wherein only the processing elements in the device ID lists of the one or more PTEs participate in the TLB shootdown when none of the one or more PTEs is marked in the IDOF state.

6. The computing system of claim 4, wherein the TLB shootdown is performed in all processing elements that operate or have operated in the same address space when at least one of the one or more PTEs is marked in the IDOF state.

7. A non-transitory computer readable storage medium having instructions recorded thereon that, when executed by a computing device, cause the computing device to perform operations comprising:
initializing a device identifier (ID) list for each page table entry (PTE) in a page table in a memory in the computing device, wherein each PTE includes a translation of virtual memory addresses to physical memory addresses and the device ID list includes up to N device IDs and each device ID is associated with a processing element in the computing device;
adding and removing device IDs from the device ID list for a PTE in response to copies of the translation from the PTE being inserted or evicted from one or more TLBs in the computing device;
marking a PTE in a device ID overflow (IDOF) state in response to the device ID list of the PTE exceeding a capacity of the device ID list, wherein the IDOF marking is a special state marking that indicates an overflow of the device ID list of a PTE; and
determining the IDOF state for a PTE;
determining one or more of the one or more processing elements to participate in a TLB shootdown of the PTE in response to determining the IDOF state; and
performing the TLB shootdown for the determined one or more processing elements.

8. The non-transitory computer readable storage medium of claim 7, wherein only the processing elements in the device ID lists of the one or more PTEs participate in the TLB shootdown when none of the one or more PTEs is marked in the IDOF state.

9. The non-transitory computer readable storage medium of claim 7, wherein the TLB shootdown is performed in all processing elements that operate or have operated in the same address space when at least one of the one or more PTEs is marked in the IDOF state.

10. A method for use in a computing system to reduce translation lookaside buffer (TLB) shootdown overheads, the method comprising:
initializing a reference count for each page table entry (PTE) in a page table in a memory in the computing system to zero, wherein the reference count indicates a number of TLBs caching a translation of virtual memory addresses to physical memory addresses from the PTE;
incrementing the reference count when a translation from the PTE is added to a TLB in the computing system;
decrementing the reference count when a translation is evicted from the TLB;
initializing a device identifier (ID) list for each PTE in the page table in the memory in the computing system, wherein the device ID list includes up to N device IDs for each PTE and each device ID is associated with a processing element in the computer system;
adding and removing device IDs from the device ID list for a PTE in response to copies of a translation from the PTE being inserted or evicted from TLBs;
marking a PTE in a device ID overflow (IDOF) state in response to the device ID list of a PTE exceeding a capacity of the device ID list, wherein the IDOF marking is a special state marking that indicates an overflow of the device ID list of a PTE;
determining one or more processing elements to participate in a TLB shootdown of the PTE in response to determining the IDOF state and the reference count for a PTE; and
performing the TLB shootdown for the determined one or more processing elements.

11. The method of claim 10, further comprising updating the translation for each of the one or more PTEs if the TLB shootdown is needed for one or more PTEs when it is determined that the reference count for any of the one or more PTEs is zero.

12. The method of claim 10, further comprising clearing the IDOF state of a PTE in response to the reference count reaching zero when the PTE is marked in the IDOF state.

13. The method of claim 10, further comprising checking whether any of the one or more PTEs is marked in the IDOF state in response to determining that the TLB shootdown is needed.

14. The method of claim 13, wherein only the processing elements in the device ID lists of the one or more PTEs participate in the TLB shootdown when none of the one or more PTEs is marked in the IDOF state.

15. The method of claim 14, wherein the TLB shootdown is performed in all processing elements that operate or have operated in the same address space when at least one of the one or more PTEs is marked in the IDOF state.

* * * * *